(12) United States Patent
Dickson

(10) Patent No.: US 11,606,140 B2
(45) Date of Patent: *Mar. 14, 2023

(54) FREE SPACE OPTICAL TERMINAL WITH DITHER BASED ALIGNMENT

(71) Applicant: SA Photonics, Inc., Los Gatos, CA (US)

(72) Inventor: William C. Dickson, Granville, OH (US)

(73) Assignee: SA PHOTONICS, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/383,336

(22) Filed: Jul. 22, 2021

(65) Prior Publication Data

US 2022/0021452 A1 Jan. 20, 2022

Related U.S. Application Data

(63) Continuation of application No. 16/856,953, filed on Apr. 23, 2020, now Pat. No. 11,082,128.

(60) Provisional application No. 62/972,570, filed on Feb. 10, 2020.

(51) Int. Cl.

| H04B 10/112 | (2013.01) |
| H04B 10/67  | (2013.01) |
| H04B 10/114 | (2013.01) |
| H04B 10/116 | (2013.01) |
| H04B 10/077 | (2013.01) |

(52) U.S. Cl.
CPC ..... *H04B 10/1123* (2013.01); *H04B 10/0775* (2013.01); *H04B 10/116* (2013.01); *H04B 10/1143* (2013.01); *H04B 10/676* (2013.01)

(58) Field of Classification Search
CPC .......................... H04B 10/112; H04B 10/1123
See application file for complete search history.

(56) References Cited

U.S. PATENT DOCUMENTS

| 6,690,888 B1 * | 2/2004 | Keller ................. H04B 10/112 398/201 |
| 7,627,249 B1 * | 12/2009 | Izadpanah .......... H04B 10/1121 398/115 |
| 11,082,128 B1 * | 8/2021 | Dickson ............. H04B 10/1143 |

(Continued)

*Primary Examiner* — Shi K Li
(74) *Attorney, Agent, or Firm* — BakerHostetler; Tayan B. Patel

(57) ABSTRACT

Embodiments relate to a bidirectional free space optical (FSO) communications system. Specifically, data-encoded FSO beams are transmitted and received between two terminals. A transmit (Tx) direction of a beam transmitted from the first terminal is dithered by a beam steering unit (BSU). As the dithered beam is received by the second terminal, the power levels of the beam are measured. The power levels are then encoded in a data-encoded FSO beam transmitted to the first terminal. This allows the first terminal to decode the received FSO beam and determine the power levels. The power levels allow the first terminal to determine Tx direction misalignments and adjust the Tx direction for the Tx beam sent to the second terminal. This process may be repeated to reduce Tx misalignments and may be performed by both terminals such that each terminal sends power level information to the opposite terminal.

20 Claims, 8 Drawing Sheets

(56) References Cited

U.S. PATENT DOCUMENTS

| | | | |
|---|---|---|---|
| 2003/0043435 A1* | 3/2003 | Oettinger | H04B 10/1149 398/129 |
| 2004/0057730 A1 | 3/2004 | Littlejohn et al. | |
| 2014/0248049 A1* | 9/2014 | Saint Georges | H04B 10/1125 398/115 |

* cited by examiner

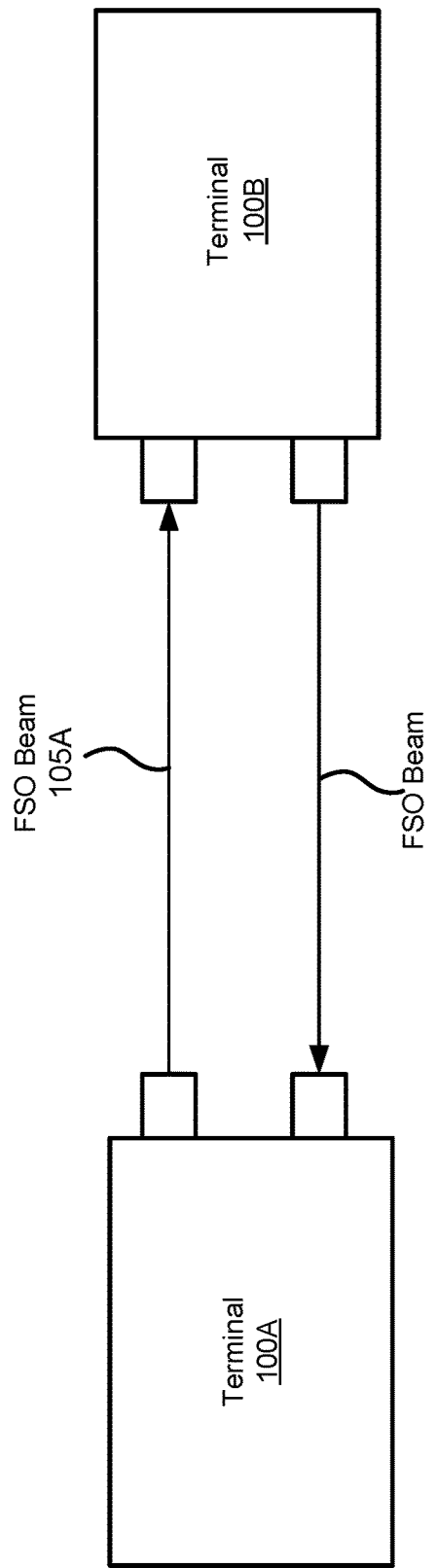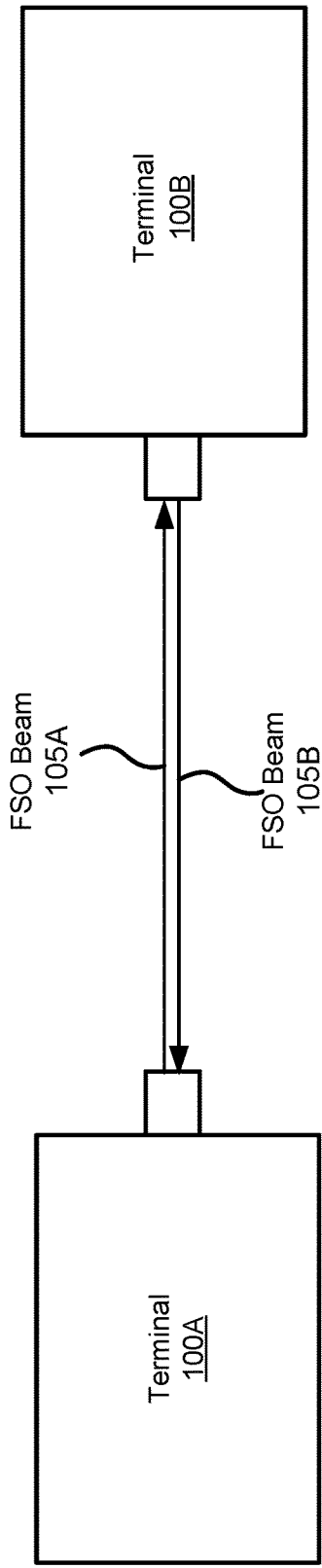
FIG. 1A
FIG. 1B

FREE SPACE OPTICAL TERMINAL WITH DITHER BASED ALIGNMENT

CROSS-REFERENCE TO RELATED APPLICATION

This application is a continuation of U.S. patent application Ser. No. 16/856,953 filed on Apr. 23, 2020, which claims priority under 35 U.S.C. § 119(e) to U.S. Provisional Patent Application Ser. No. 62/972,570, "Free Space Optical Terminal with Dither Based Alignment," filed on Feb. 10, 2020, each of which is hereby incorporated by reference in its entirety.

BACKGROUND

1. Technical Field

This disclosure relates generally to free space optical (FSO) communications and, more particularly, to reducing alignment errors between FSO terminals.

2. Description of Related Art

Free space optical (FSO) communications is a communications technology that uses light propagating in free space to wirelessly transmit data, for example, for telecommunications or computer networking. Here, "free space" is a medium wherein light propagates; it can include air, water, outer space, or vacuum. This contrasts with guided wave communications over media such as coaxial cable or optical fibers. FSO technology is useful where physical connections are impractical due to high costs or other considerations. In contrast with other free-space electromagnetic communication media, FSO signals are more directional. This confers benefits both for communications capacity and for communications privacy.

The high directionality of FSO signals, however, requires more accurate pointing alignment between systems to maintain the benefit of the directionality. The requirement for accuracy is so demanding that mechanical movement or flexing of the terminal mounting structure, or even the optical effects of atmospheric turbulence can degrade communications performance. Pointing accuracy benefits generally accrue when the transmission beam's electromagnetic wavelength is short (or equivalently, when the electromagnetic frequency is high); this can apply not only FSO systems, but other communications that depend on accurate propagation alignment as well. When FSO communications terminals operate in unpredictable or rapidly changing conditions, measures may be required to maintain alignment between stations. For example, if an FSO node is mounted on a tower, strong winds may move the tower such that the FSO terminal sways with the tower. In another example, an FSO terminal is mounted on a moving vehicle that communicates with a stationary FSO terminal. In these and similar situations, the high directionality of FSO technology may require rapid adjustment and accurate pointing to maintain a viable FSO communications link.

SUMMARY

A bidirectional free space optical (FSO) communications system is described herein. The system includes data-encoded FSO beams that are transmitted and received between two terminals, establishing bidirectional communication. Each terminal acts as a transmit (Tx) terminal for one direction of the link and as a receive (Rx) terminal for the other direction of the link. A beam-steering unit (BSU) is associated with the transmitter and this steers the data-encoded FSO beam toward the receiver. To improve (e.g., optimize) its pointing angle, the BSU may dither the Tx beam angle about its currently-estimated Tx direction. The Rx terminal of each link measures the received power of the incoming dithered FSO beam; it encodes the receive power measurements into its own Tx FSO beam that is propagated in the reverse direction, making this information available to the first terminal. The first terminal uses the power measurements from the far terminal to reduce Tx beam steering errors. The data path for the power measurements is advantageously the data-encoded FSO beam transmitted from the Rx terminal to the Tx terminal, which in this context will be referred to as the return FSO beam, however, other data paths such as radio frequency (RF) communication may be used instead. A control system on the Tx terminal can then use the power measurements as a feedback signal to adjust the direction of its FSO beam. This process may be performed once or repeated on a regular basis as needed for a specific operating environment.

Dithering is characterized by a pair of periodic basis functions $\hat{X}(t)$ and $\hat{Y}(t)$ that describe the dithering "path" in angular deflection. The actual beam deflection is then a scaled version of these basis functions. Although we consider the simple trigonometric functions sine and cosine for $\hat{X}(t)$ and $\hat{Y}(t)$, embodiments are not limited to these functions. Alternate implementations may take advantage of other periodic forms of $\hat{X}(t)$ and $\hat{Y}(t)$ that cover a non-uniform beam perturbation pattern. For example, applications of embodiments to other environments such as onboard a ship or an airplane could entail substantially different disturbance patterns and amplitudes that might motivate different preferred functions for of $\hat{X}(t)$ and $\hat{Y}(t)$. Alternate forms of $\hat{X}(t)$ and $\hat{Y}(t)$ might also be motivated by ease of implementation, especially when dithering is implemented through mechanical system displacement.

In some embodiments, both terminals use this dither approach for alignment detection. Terminal 1 transmits an FSO beam to terminal 2, and terminal 2 transmits an FSO beam to terminal 1. In one approach, the motion generator in terminal 1 dithers the direction of its transmitted FSO beam at a frequency $f_1$ and the motion generator in terminal 2 dithers the direction of the FSO beam at frequency $f_2$. For the FSO beam transmitted from terminal 1 to terminal 2, the power received at terminal 2 will depend on the $f_1$ dither imparted at terminal 1 and may also be affected by the $f_2$ dither imparted by terminal 2. In some embodiments, the effect of the $f_2$ dither is reduced or separated by selection of the frequencies $f_1$ and $f_2$ in conjunction with a given signal processing algorithm.

In some embodiments, the BSU dithers the direction of the transmitted FSO beam in two dimensions. For example, it may impart a conical (elliptical or circular) scan in the transmitted beam. If the dither is a circular scan of amplitude $A_d$ and frequency $f_1$, then alignment errors $X_{10}$ and $Y_{10}$ in the X- and Y-directions of the transmitted FSO beam may be described by:

$$X_{10} = \frac{R_{g1}}{2A_d} \langle \log(P_2(t)) \times \cos(\omega_1 t) \rangle \quad (1)$$

$$Y_{10} = \frac{R_{g1}}{2A_d} \langle \log(P_2(t)) \times \sin(\omega_1 t) \rangle$$

In these expressions, $R_{g1}$ is the beam radius of the transmitted FSO beam, $P_2$ is the received power of the transmitted FSO beam, $\omega_1 = 2\pi f_1$, and angle brackets denote time average. The sine and cosine functions as written in the equation apply to the case of a circular dithering pattern. Alternate dithering patterns (as noted earlier) would require a different pair of appropriately selected periodic functions to express the dither pattern. The equation assumes that the FSO beam overfills the aperture at the receiver. The unitless amplitude scale factor value $A_d$ is not critical, but preferably is a small fraction of 1.0, such as 0.2.

The data path from the receiver back to the transmitter for the measured power is advantageously in the form of the return FSO beam from the receiver. In some embodiments, the return FSO beam includes data (received power data) that represents the received power of the transmitted FSO beam at the receiver. In some embodiments, this data is included in a packet header of the return FSO beam. In some embodiments, the received power data includes data for at least two different measures of the received power. For example, the Rx terminal may include a demodulation path and a wavefront sensing path, and one measure of received power may be based on power in the demodulation path while another measure is based on power in the wavefront sensing path. A selector may determine which power measure to use.

In some embodiments, the demodulation path is implemented as follows at the receiver. The BSU directs the incoming FSO beam onto the terminal's input port, where it is coupled into an optical fiber which then leads to the rest of the demodulation path. An optical tap from the optical fiber leads to a detector, which measures the power in the demodulation path. In some embodiments, the wavefront sensing path may use a multi-cell sensor (such as a quad-cell sensor). The total power received by the multi-cell sensor is a measure of the power in the wavefront sensing path.

In other embodiments, the alignment approach described above may be used in only one of the terminals. Alternatively, the FSO communications system may not be directional and the data path may be implemented by a communications channel other than a return FSO beam, such as a radio frequency (RF) link.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features that will be more readily apparent from the following detailed description and the appended claims, when taken in conjunction with the examples in the accompanying drawings, in which:

FIGS. 1A and 1B are block diagrams of two terminals communicating via FSO communications links, according to some embodiments.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

The technology relates to measuring system response as it makes small, controlled changes in pointing angle. This is used to improve the pointing direction. We use the term "dither" to refer to these directional pointing variations. In some technical fields, "dither" refers to the addition of "white" or indeterminate noise; our application of "dither" is determinate and operates to improve the optical configuration by applying known variations and correlating the resulting changes to system performance. Many different approaches may be used to implement the pointing variations (i.e., to generate the dither). For example, a mirror or reflective surface in front of the terminal might be tilted mechanically to implement pointing variation. Alternatively, a rotating prism or series of prisms might be used. Lenses, internal or external to the rest of the optical train, may be shifted laterally across the optical axis to implement pointing variation. A detection device may also be shifted relative to the optical axis to implement pointing variations; this is an example of pointing variation without the optical elements being re-oriented at all.

FIGS. 1A and 1B are block diagrams of terminals 100A and 100B communicating via free space optical (FSO) communications links, according to some embodiments. Specifically, the terminals 100 are communicating by transmitting and receiving data-encoded FSO beams 105. In FIG. 1A, each terminal 100 receives and transmits FSO beams 105 through different apertures, while in FIG. 1B, the terminals are co-boresighted so that beams are received and transmitted though the same aperture. As described herein, if terminal 100A is referenced, terminal 100B may be referred to as a remote terminal, beam 105A may be referred to as a transmit (Tx) beam, and beam 105B may be referred to as a receive (Rx) beam. Intermediate beam configurations between single- and multi-aperture are also possible, wherein the beam is split into dithered and undithered beams by a partially reflective surface. These are not illustrated.

As further described below, each terminal 100 dithers the direction of its Tx beam. The opposite terminal detects the received power of the incoming FSO beam 105 and can transmit this power information back to the transmitting terminal 100. The transmitting terminal 100 can use this information to detect alignment errors and adjust the direction of its Tx beam to reduce (e.g., minimize) the detected alignment errors.

Figure 2A:
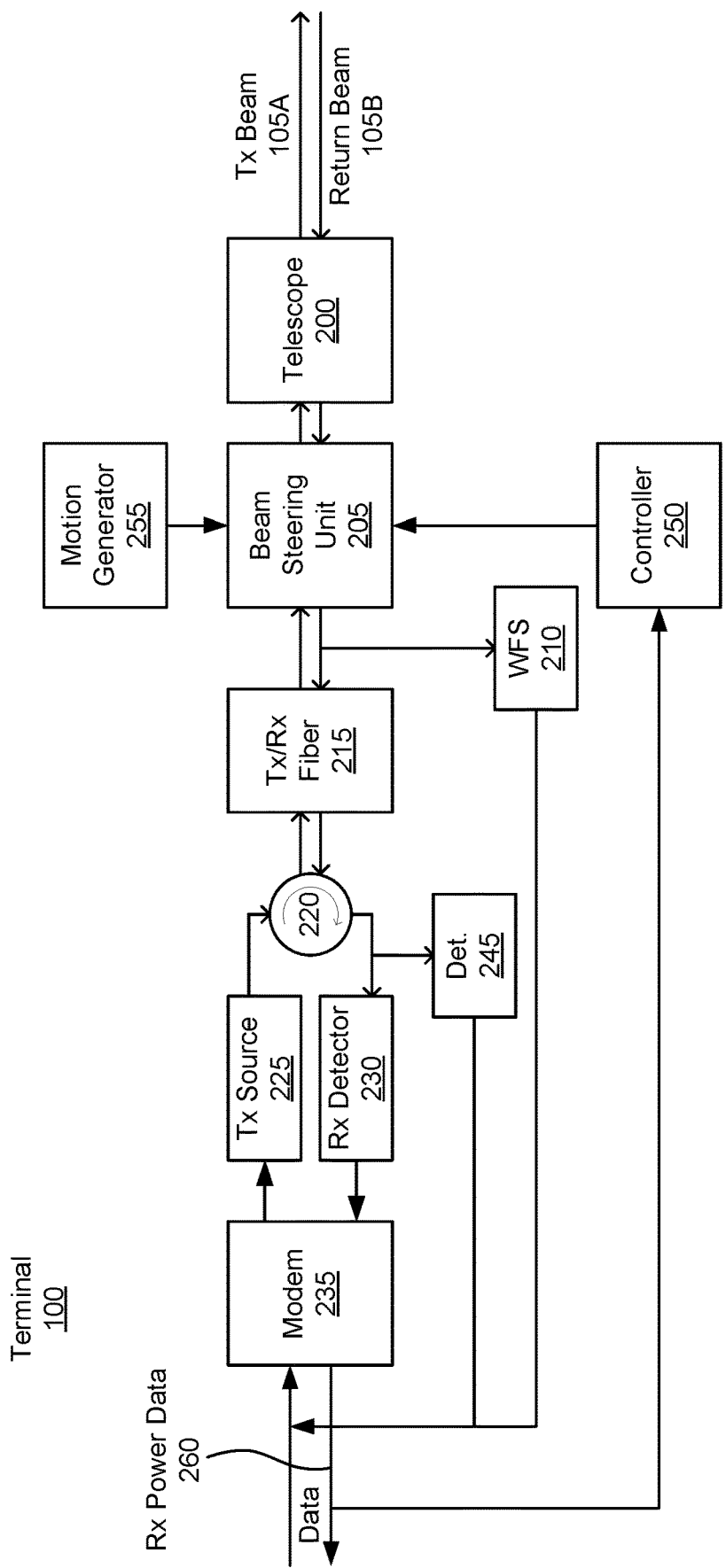
FIG. 2A is a block diagram of a single terminal, according to an embodiment.

FIG. 2A is a block diagram of a single terminal 100, according to an embodiment. The terminal 100 includes a data I/O interface (not shown), modem 235, Tx source 225, Rx detector 230, a circulator 220, a Tx/Rx fiber 215, a wavefront sensor 210, a BSU 205, a telescope 200, a motion generator 255, a power detector 245, and a controller 250. In FIG. 2A, electrical signals (both analog and digital) are indicated by the solid arrows and optical signals (both guided and free space) are indicated by the line arrows.

The components are optically coupled as follows. The telescope 200 is optically coupled to the BSU 205. The BSU 205 is optically coupled to the wavefront sensor 210. It is also optically coupled to the circulator 220 via the fiber 215. The ports of the optical circular 220 are optically coupled to the Tx source 225, the Tx/Rx fiber 215 and the Rx detector 230. The power detector 245 detects light that is tapped from the light to the Rx detector 230.

The components are electrically coupled as follows. The motion generator 255 and controller 250 are electrically coupled to the BSU 205. The modem 235 is electrically coupled to the Tx source 225 and the Rx detector 230. It also receives data from the power detector 245 and wavefront sensor 210 (after conversion to digital form) and provides data to the controller 250.

Figure 2B:
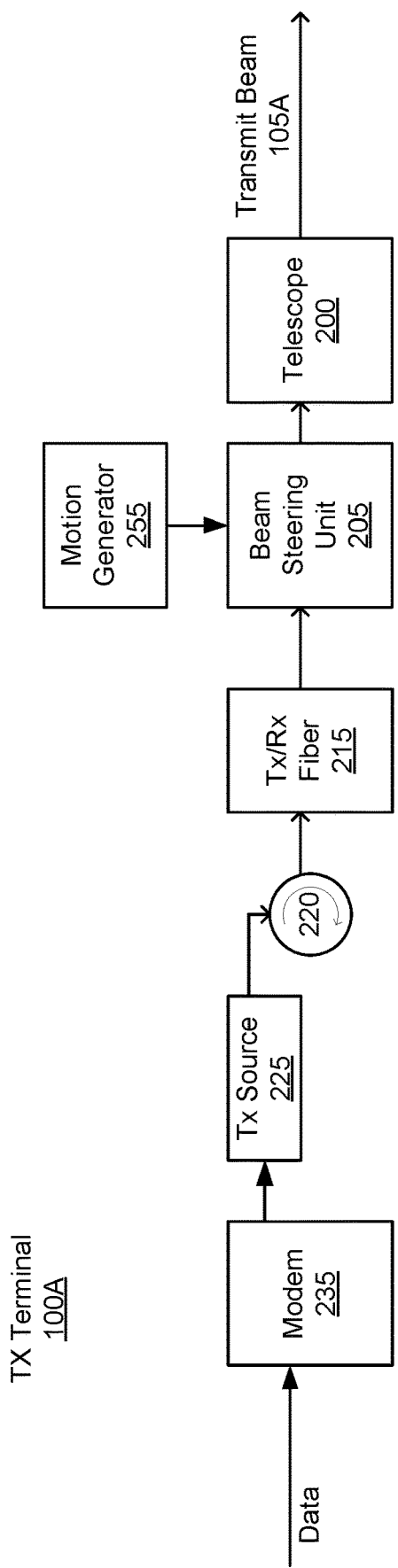
FIGS. 2B-2E are block diagrams of a single FSO communications link with feedback loop, according to an embodiment.
Figure 2C:
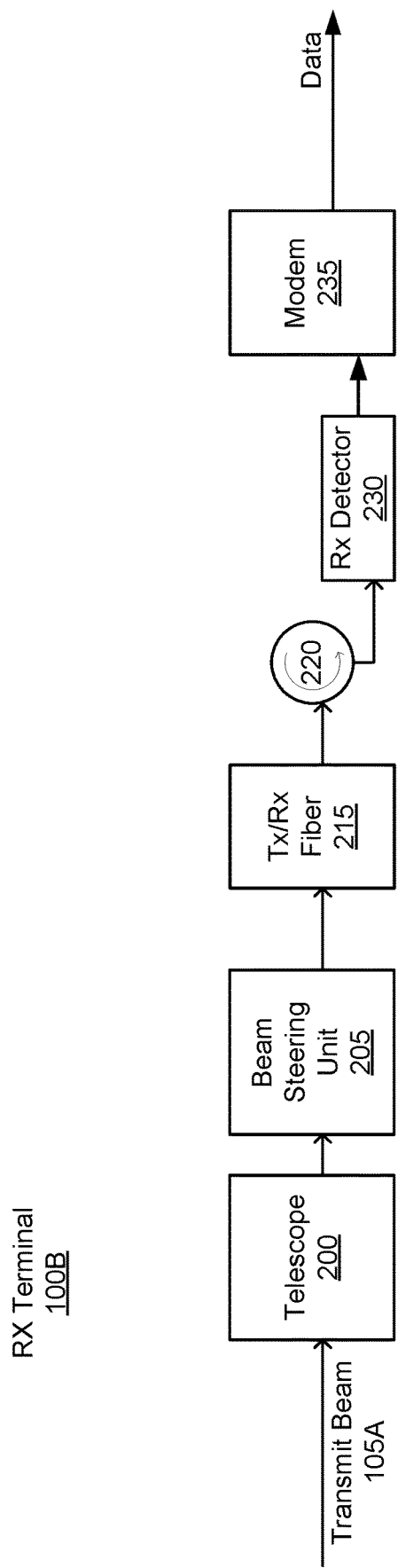

FIGS. 2B-2E illustrate one FSO communications link from a Tx terminal to a Rx terminal. FIGS. 2B and 2C show the data path from Tx terminal 100A to Rx terminal 100B. FIG. 2B shows the data path in the Tx terminal 105A from incoming digital data to outgoing FSO transmit beam 105A. Modem 235 modulates the Tx source 225 based on the incoming data. The data-encoded light is transmitted by circulator 220, fiber 215, BSU 205 to telescope 200, which directs the data-encoded FSO beam 105A to the Rx terminal 105B. The motion generator 255 adds a dither to the direction of the Tx beam 105A, as will be described in more detail below. FIG. 2C shows the data path at the Rx terminal 105B. Relative to the Rx terminal 100B, the incoming beam is its Rx beam, but it is labelled as transmit beam 105A in FIG. 2C to maintain consistency throughout the figures. The transmit beam 105A is optically coupled from telescope 200, to BSU 205, fiber 215 and circulator 220 to the Rx detector 230. The output of the Rx detector 230 is demodulated by modem 235 to produce the outgoing digital data.

Figure 2D:
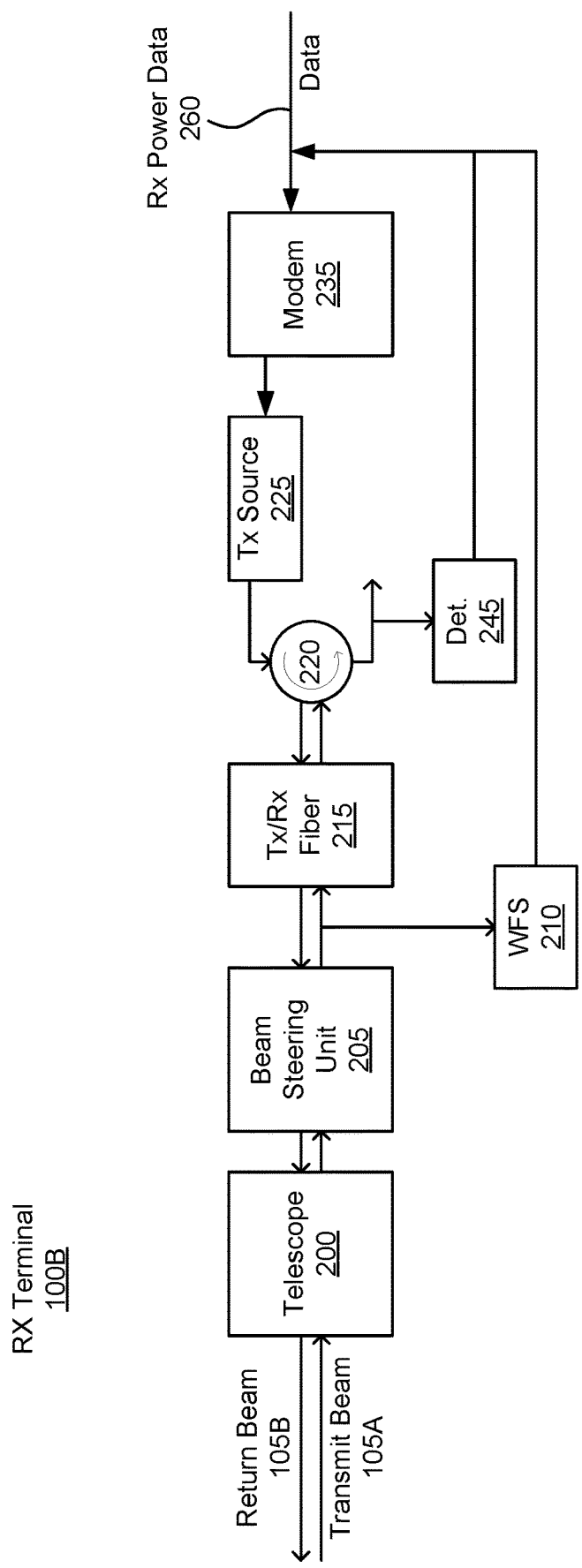
Figure 2E:
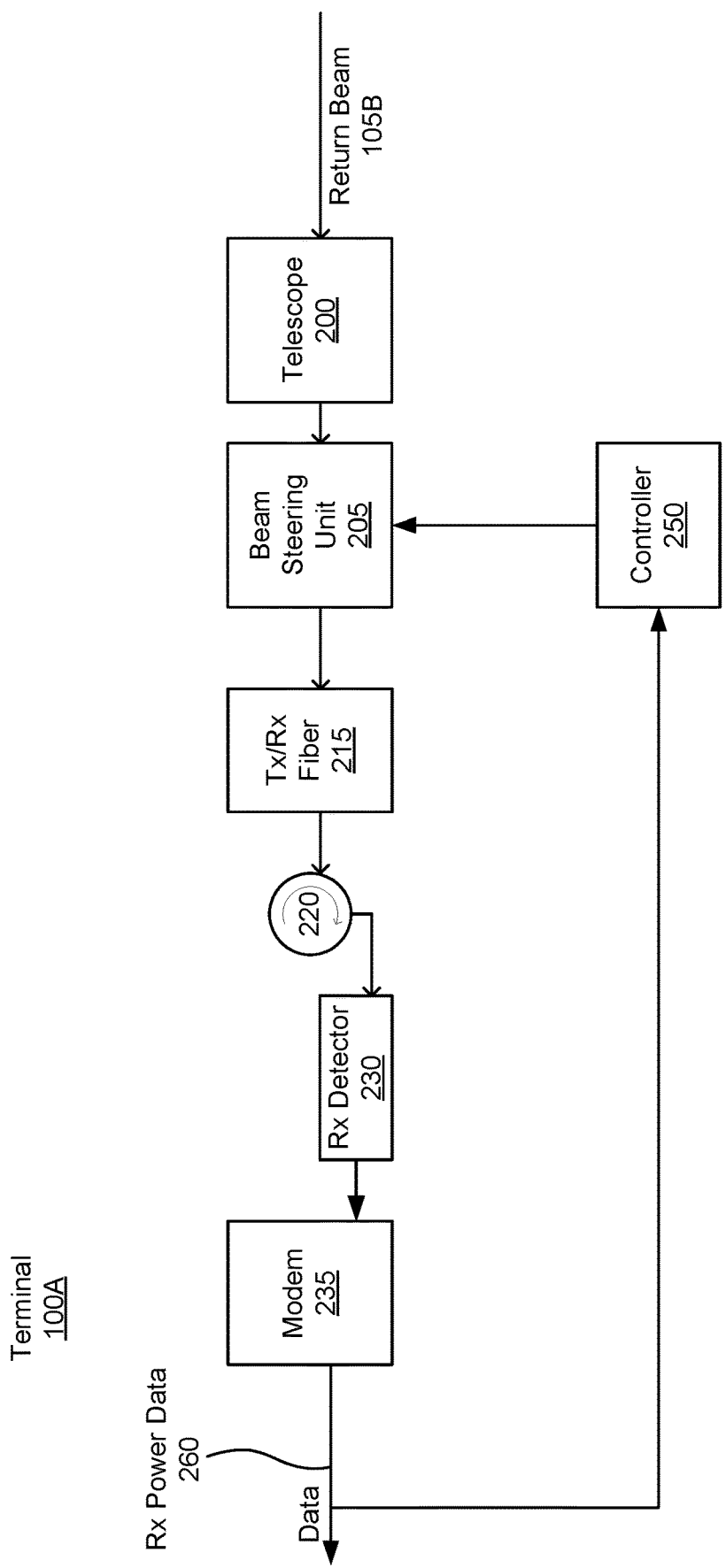

FIGS. 2D and 2E show the feedback loop from the Rx terminal 100B back to the Tx terminal 100A. FIG. 2D shows the feedback path in the Rx terminal 100B. The received power may be measured at two locations in this example. One is the sum power received by the wavefront sensor 210. The other is power detector 245, which takes an optical tap from the main data path used to demodulate the incoming data. These measurements may be processed (not shown in FIG. 2D) and the resulting data will be referred to as receive power data 260. The receive power data 260 is returned to the Tx terminal 100A via the data-encoded FSO beam 105B produced by the Rx terminal 100B. With respect to the Rx terminal 100B, the beam 105B is its transmit beam but it is labelled as return beam 105B to maintain consistency through the figures. FIG. 2E shows the feedback path in the Tx terminal 100A. The return FSO beam 105B is demodulated and the recovered receive power data 260 is used by controller 250 to control the BSU 205 to maintain alignment.

FIGS. 2B-2E unroll the transmit data path and return feedback loop for an FSO communications link which involves two terminals. FIG. 2A shows both aspects for a single terminal. The terminal 100 includes at least two optical paths: an Rx beam path and a Tx beam path. In the Rx beam path, a Rx beam 105B propagates through the telescope 200 and is directed towards the BSU 205. The BSU 205 steers the Rx beam to the wavefront sensor 210. A portion of the beam is detected by the wavefront sensor 210 and another portion of the beam is coupled into the fiber 215. Light in the fiber 215 is directed by the circulator 220 to the Rx detector 230. In the Tx beam path, a Tx beam from the Tx source 225 is directed to the fiber 215 by the circulator 220. The Tx beam is emitted from the fiber 215 and towards the BSU 205. The Tx beam is directed by the BSU 205 towards the telescope 200. The Tx beam 105A propagates through the telescope 200 and into free space.

The telescope 200 and BSU 205 are optical components that direct Rx beams to the wavefront sensor 210 and fiber 215, and direct Tx beams to the remote terminal. The telescope 200 includes components that can spread, focus, redirect, and otherwise modify the beams 105 passing through it. The position of the telescope 200 relative to the terminal 100 is typically fixed. The telescope 200 may be as simple as a single lens or it may include additional optical components, such as diffusers, phase screens, beam expanders, mirrors, and lenses.

The BSU 205 can take many different forms. The BSU 205 can be a mechanically-driven reflective or refractive device. Examples of such devices include mirrors, Fresnel devices, lenslet arrays and more. A mechanical driver for any one of these examples can consist of voice-coil actuators, piezoelectric actuators, servo-motor driven positioners, and many other approaches. In another example, a series of wedge-shaped prisms may be put in continuous rotation at different rates to produce a complex dithering pattern through the series. Microelectronic arrays (MEMS) devices can also be used to steer a beam. Opto-acoustic devices that exploit acoustic waves in reflective or refractive materials can also be used. The BSU 205 may operate in different modes, such as a beam acquisition mode or a beam tracking mode. For example, an initial Tx direction can be established through a beam acquisition mode. The Tx direction may be determined or updated based on feedback signals (e.g., alignment errors) from the controller 250 and the wavefront sensor 210 (this feedback path not shown in FIG. 2). In some cases, the Tx beam 105A is transmitted by the telescope 200 along the same direction as the Rx beam 105B is received (the Rx direction may be determined from the wavefront sensor 210). In some cases, the Tx direction is not parallel to the Rx direction. For example, atmospheric conditions between terminals 100 can affect beams differently depending on their propagation direction. In these cases, Tx and Rx beams may travel different optical paths between terminals 100. In another example, if a remote terminal is moving, the BSU 205 may direct a Tx beam with an angular bias (referred to as point-ahead bias) to account for travel time of the Tx beam.

Although the figures illustrate an implementation concept with a dithering device deflecting the entire Tx and Rx beams, other embodiments are possible, in which only part of the beam (Tx or Rx) is dithered. The beam could be divided, for example, with a partially reflective mirror extending across the entire beam, or a small mirror might dither only a spatially selected portion of the beam. Such an embodiment, where only part of the beam is dithered while most of the communication beam is not dithered, benefits by reducing or eliminating the variable power of dithering onto the communication channel.

While steering Tx beams in a Tx direction towards a remote terminal, the BSU 205 may dither the Tx direction. Specifically, the motion generator 255 can generate control signals to dither the Tx direction. The Tx direction can be dithered along one or more axes. For example, conical scans (circular and elliptical) are two-dimensional dither patterns that may be used. The dither frequency is preferably at least 5×-10× larger than the desired bandwidth of the closed-loop system while observing any limitations related to the data packet broadcast repetition rate or other FSO frequencies. In some embodiments, increased performance occurs when the closed-loop system bandwidth is greater than the beam deflection being countered. The amplitude of the dither should be high enough to yield sufficiently low noise in the detected alignment errors, but low enough to reduce (e.g., minimize) the coupling loss due to the intentionally mispointed Tx beam. An example preferred dither amplitude of about 1/s of the Tx Gaussian beam divergence radius (1/e radius) may provide a suitable compromise between detection noise and coupling. During periods of low interference (e.g., little terminal movement), the dither may be set to a small fraction of the Tx beam size to reduce the likelihood of (e.g., prevent) the dither from causing data transmission errors. During periods of high interference (for example, a tower-mounted unit during periods of high wind), the dither amplitude may be increased to reduce the likelihood (e.g., ensure) that uncontrolled terminal motion or variability does not overcome and invalidate the system's estimate of position-to-performance correlations. During periods of extreme interference, the system may abandon data throughput objectives in favor of maintaining or recovering system-to-system alignment. Dithering is further described with reference to FIG. 3.

The wavefront sensor 210 is a component used to measure the incidence angle of the Rx beam relative to the Tx direction. The wavefront sensor 210 may be a quad-cell (or other multi-cell) sensor. The detectors of the wavefront sensor 210 can be photodetectors or other electromagnetic-wave detectors that convert the incoming electromagnetic waves into electrical current. The wavefront sensor 210 can include light detectors capable of detecting different types of light signals, e.g., low and high light intensities, specific wavelengths, etc. This allows the terminal 100 to operate in low light (e.g., at night) and high light situations (e.g., at mid-day). The wavefront sensor 210 may include a hole filled by an end of the fiber 215. In one implementation, light that does not enter the fiber falls on other light sensors near the hole; the relative amplitudes of signal in each of these nearby sensors indicates the wavefront alignment relative to the fiber 215. In another example, the wavefront sensor 210 includes a fiber bundle connected to detectors, and light detected in the non-central fibers similarly indicates wavefront alignment. These example wavefront sensors 210 and fiber combinations 215 are described in U.S. Pat. No. 10,389,442 "Free Space Optical (FSO) System" and U.S. Pat. No. 10,411,797 "Free Space Optical Node with Fiber Bundle" which are incorporated herein by reference in their entirety.

The Tx/Rx fiber 215 is an optical fiber, such as a multi-mode fiber (MMF), dual core fiber, or double clad fiber. If the fiber 215 is a double clad fiber, Tx beams may propagate through the core while Rx beams propagate predominantly through the inner cladding. The circulator 220 can be a single-mode or multi-mode circulator. Example circulators are described in patent application Ser. No. 16/259,899 "Optical Circulator with Double-Clad Fiber" which is incorporated herein by reference in its entirety. In most FSO applications, the configuration described in this application works better than single-mode circulator configurations. The Rx detector 230 is a photodetector that converts Rx beams from the circulator 220 into electrical signals. For example, the Rx detector 230 is an avalanche photodiode (APD). The Tx source 225 converts transmit data from the modem 235 into Tx beams. The Tx source 225 can include a laser.

The power detector 245 determines power levels of an Rx beam received by the terminal 100. The power detector 245 can determine the power levels of an Rx beam coupled into the fiber 215 (referred to as the received signal strength indicator (RSSI) signal). This is one measure of the power of the incoming beam. Another measure is the power of the Rx beam incident on the wavefront sensor 210 (referred to as the $P_{QC}$ signal). The $P_{QC}$ signal may be determined by summing the power received by each of the detectors of the wavefront sensor 210. As described earlier, an implementation may have independently-steered dithered and undithered beams. This may be accomplished, for example, with separate apertures or by diverting part of a single beam with a part-reflecting mirror. Such a configuration may exploit power measurements taken with the dithered and non-dithered beams. If the wavefront sensor 210 is a quad cell, the signal strength from the four detectors are added together to determine $P_{QC}$. In another example, if the wavefront sensor 210 includes a fiber bundle, the signals detected in each of the fibers are summed. To determine the RSSI signal, an optical tap or an optic splitter may be used to sample a portion of light or direct a portion of light in the fiber 215 (or the fiber to the Rx detector 230, as shown in FIG. 2) to the power detector 245. An avalanche photodiode (ADP) and an analogue to digital converter (ADC) may be used to determine the amount of light coupled into the fiber 215. Since less light may be coupled into the fiber 215 compared to the amount of light incident on the wavefront sensor 210, the $P_{QC}$ signal may be a better indicator of received power than the RSSI signal. Depending on details of system architecture, the RSSI indicator may be more sensitive to intermittent impairments (such as in heavy rain). After the $P_{QC}$ signal and the RSSI signal are determined, the signals are transmitted to the modem 235 to be encoded in a Tx beam and transmitted to the remote terminal. This allows the remote terminal to determine the received power levels of beams received by the terminal 100. Note that the term "power" as used herein is used for simplicity. In some embodiments, the determined power levels are the light energy received over time (e.g., the radiant flux). In other embodiments, the determined power levels are indicators of the received power, such as signals that represent, are proportional to, or approximate to the power received by the terminal 100.

The modem 235 modulates data to be transmitted in Tx beams. The data includes header information from the I/O interface 240 that may include received beam power and terminal status information. The modem 235 combines and converts this and the data "payload" that is to be delivered to the network beyond the FSO link itself into a single data stream as a modulated electrical signal. In some embodiments, power information as well as terminal status and BSU status (as opposed to raw power measurements) may be processed to compress them and occupy less of the final data stream. The modulated electrical signal is sent to the Tx source 225 and imparted on the Tx beam as a modulation. The modem can also demodulate data encoded in Rx beams. Specifically, the modem 235 decodes information in the electrical signals from the Rx detector 230. The decoded information can include received power data 260, which may be separate from the payload data. This received power data 260 is transmitted to the controller 250. The remaining decoded information may be transmitted to I/O interface (e.g., to be transmitted to another terminal). The modem 235 can include any electronics and/or computer instructions that modulate or demodulate signals, including physical (PHY) layer or medium access control (MAC) related processes (such as error correction).

The controller 250 receives received power data 260 from the modem 235 that was previously encoded in a Rx beam. The received power data is representative of the received power of a previous beam transmitted by the terminal 100 and detected by the remote terminal. The received power data can include the $P_{QC}$ and RSSI signals as determined by the remote terminal and the time and date of the power measurements. If the remote terminal was also dithering its Tx beam while the beam was received, the received power data can include dithering information of the remote terminal (e.g., in the header), such as the frequency, amplitude, and direction of the dithering. In a preferred embodiment, the header information is structured in a way that received power, dithering information, and other remote terminal information are readily extracted from the header. In some FSO implementations, the transmitted power changes adaptively (for example, to conserve power, to reduce (e.g., minimize) likelihood of intercept, and other concerns). In such cases, the remote terminal may transmit information concerning its transmitted power or its beam-pointing state and the receiving terminal may elect to incorporate this information into its own pointing control system. The controller 250 uses the received power data to determine alignment errors between the transmitting terminal 100 and the remote terminal and to adjust a Tx direction of the Tx FSO beam to correct the alignment errors. Determining the alignment errors is further described below with respect to Eqs. 2-6 below.

Figure 3:
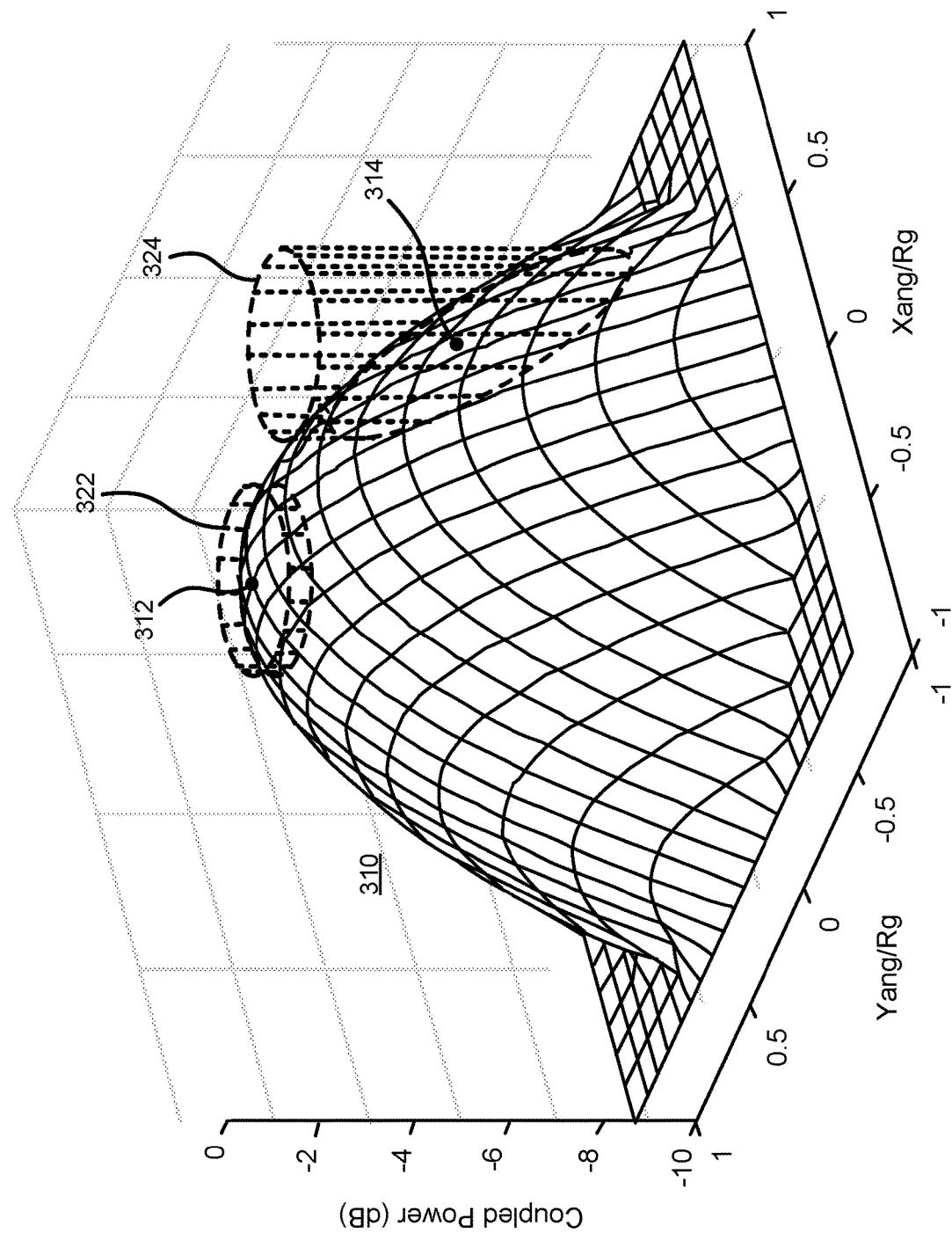
FIG. 3 is a plot that illustrates the effect of dithering on received power, according to an embodiment.

FIG. 3 is a plot that illustrates the effect of dithering on received power, according to an embodiment. The main plot 310 plots received power at the Rx terminal as a function of the X- and Y-misalignment of the Tx beam. The Z-axis is the coupled beam power normalized by the power with no misalignment, measured in decibels (dB). The X- and Y-axes are the misalignment of the Tx beam, normalized by the beam radius Rg. Here, the misalignments $X_{ang}$ and $Y_{ang}$ are angular misalignments, as is the beam radius Rg. In addition, the Tx beam has a Gaussian profile and overfills the aperture of the Rx terminal.

If the Tx beam is perfectly aligned with the aperture (point 312, with $X_{ang}/Rg=0$ and $Y_{ang}/Rg=0$), then the Rx aperture couples maximum power (0 dB). If the beam is misaligned with the aperture (e.g., point 314, with $X_{ang}/Rg=+0.35$ and $Y_{ang}/Rg=-0.55$), the aperture receives less power (less than 0 dB). Thus, the received power can indicate the alignment of the Tx beam with the Rx aperture. However, if the peak power level is not known, it may be difficult to determine if the aperture is aligned with the peak of the curve. For example, the maximum power level may change based on weather conditions between the terminals 100.

To determine the location of the current Tx beam on plot 310, the Tx direction of the beam may be dithered. By dithering the Tx direction, changes in received power can indicate the location on the curve 310. In the embodiment of FIG. 3, the Tx beam is dithered using a circular scan. For the Tx beam that is nominally aligned (point 312), the circular dithering produces the trajectory 322. For the Tx beam that is misaligned (point 314), the circular dithering produces the trajectory 324. If an aperture receives more power when the direction of the Tx beam is dithered along an axis (e.g., in the −y direction), this can indicate the alignment of the Tx beam relative to the Rx aperture. Thus, by communicating the received power to the transmitter terminal, alignment errors can be calculated and corrected. This calculation is explained below.

Alignment errors (also referred to as misalignment vectors or direction misalignments) are calculated by the controller 250 using the following approach. The terminal 100 transmitting the beam will be referred to as Terminal 1 and the terminal receiving the beam will be referred to as Terminal 2. If the shape of the received beam is assumed to be Gaussian and overfills Terminal 2's aperture, then the power $P_2$ coupled by the aperture of Terminal 2 is $$P_2 = P_{20} e^{-2(X_1^2 + Y_1^2)/R_{g1}^2}, \qquad (2)$$

where $P_{20}$ is the power coupled when there is no misalignment, $X_1$ and $Y_1$ are the angle errors of the Tx direction (of Terminal 1) and $R_{g1}$ is the angle radius of the received beam. Taking the natural logarithm of both sides of Eq. 2 yields:

$$\log P_2 = \log P_{20} - 2(X_1^2 + Y_1^2)/R_{g1}^2. \qquad (3)$$

If Terminal 1 dithers the beam in a circular motion at frequency $f_1$, then the angle errors $X_1$ and $Y_1$ are the sum of unknown alignment errors $X_{10}$ and $Y_{10}$ and the circular dither components:

$$X_1 = X_{10} + A_d R_{g1} \cos(\omega_1 t)$$

$$Y_1 = Y_{10} + A_d R_{g1} \sin(\omega_1 t), \qquad (4)$$

where $A_d$ is the amplitude of the circular dither and $\omega_1 = 2\pi f_1$. Substituting Eq. 4 into Eq. 3 yields:

$$\log(P_2) = \qquad (5)$$
$$\log(P_{20}) - 2\frac{X_{10}^2 + Y_{10}^2}{R_{g1}^2} - A_d^2 - \frac{4A_d \cos(\omega_1 t)}{R_{g1}} X_{10} - \frac{4A_d \sin(\omega_1 t)}{R_{g1}} Y_{10}$$

Compared to the dither reference terms $\cos(\omega_1 t)$ and $\sin(\omega_1 t)$, the remaining terms in Eq. 5 are assumed to be quasi-static (having a much lower rate of change). With this assumption, the unknown alignment errors $X_{10}$ and $Y_{10}$ can be detected via demodulation of the log $P_2$ measurement with the orthogonal $\cos(\omega_1 t)$ and $\sin(\omega_1 t)$ reference signals. This is equivalent to a single-frequency Fast Fourier Transform (FFT):

$$X_{10} = \frac{R_{g1}}{2A_d} \langle \log(P_2(t)) \times \cos(\omega_1 t) \rangle \qquad (6)$$

$$Y_{10} = \frac{R_{g1}}{2A_d} \langle \log(P_2(t)) \times \sin(\omega_1 t) \rangle$$

In the equation, angle brackets $\langle \rangle$ indicate time-average over multiple cycles at rate $\omega_1$. Thus, the alignment errors of Terminal 1 ($X_{10}$ and $Y_{10}$) can be calculated after receiving log $P_2$ from Terminal 2. Similarly, the alignment errors of Terminal 2 ($X_{20}$ and $Y_{20}$) can be calculated by using the known dither frequency of Terminal 2 ($f_2$) and receiving log $P_1$ from Terminal 1.

Note that the power term detected by Terminal 2 (log $P_2$ in Eq. 5) only includes terms associated with alignment errors of Terminal 1 ($X_{10}$ and $Y_{10}$) and dither components at frequency $f_1$. In some cases, the power detected by Terminal 2 has similar loss terms associated with the alignment error terms of Terminal 2 ($X_{20}$ and $Y_{20}$) and dither reference signals at frequency $f_2$. Cross-coupling of the parallel detection processes in the presence of signal content at both frequencies $f_1$ and $f_2$ may be reduced (and possibly eliminated for DC errors) by taking advantage of the Fourier orthogonality of sinusoidal basis functions. Fourier orthogonality ensures detection orthogonality when the averages in Eq. 6 are carried out over an integer number of cycles of both $f_1$ and $f_2$. For example, if $f_1=200$ Hz and $f_2=300$ Hz, averaging over 0.01 seconds covers 2 cycles of $f_1$ and 3 cycles of $f_2$. Thus, the detection of the respective alignment error terms can be decoupled.

Figure 4:
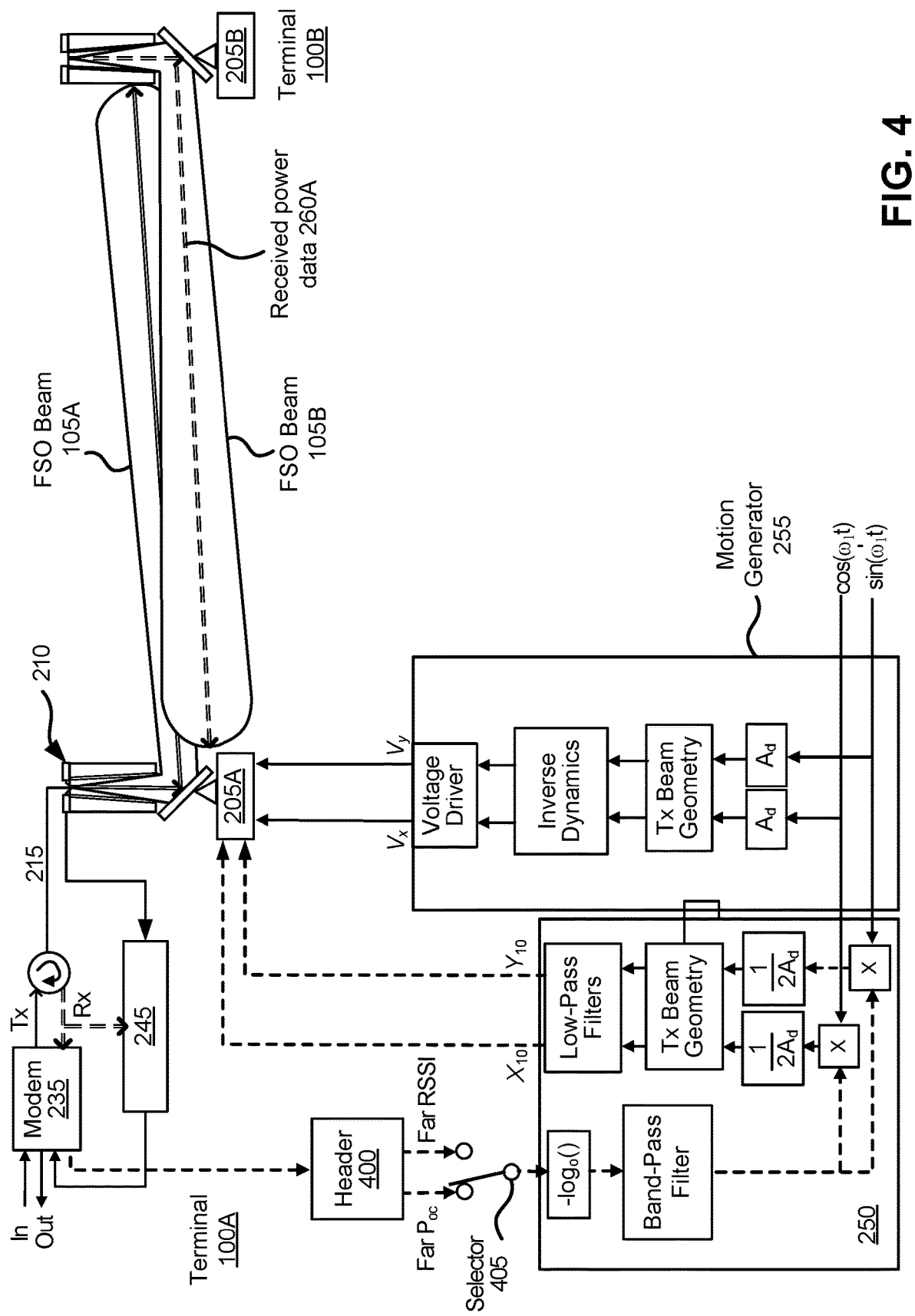
FIG. 4 is a diagram showing detail of the feedback loop, according to an embodiment.

FIG. 4 is a diagram showing detail of the feedback loop, according to an embodiment. For simplicity, some components of the terminals 100A and 100B are omitted compared to FIG. 2 (e.g., telescopes 200). In this example, terminal 100A acts as the transmitter and terminal 100B acts as the receiver. Terminal 100A transmits a Tx FSO beam 105A to terminal 100A via the BSU 205A. In this case, 205A is a fast steering mirror. Motion generator 255 adds a circular dither to the Tx beam 105A. The motion generator 255 applies voltage driving signals $V_x$ and $V_y$ to the BSU 205A. The driving signals are determined based on reference oscillators ($\cos(\omega_1 t)$ and $\sin(\omega_1 t)$), the amplitude $A_d$ of the dither, $R_{g1}$ (from the Tx beam geometry), and the inverse dynamics of the BSU 205A.

The power of Tx beam 105A received by terminal 100B is measured in two ways: by the quad cell in the wavefront sensor ($P_{QC}$) and from an optical tap along the demodulation data path (received signal strength indicator or RSSI), as described above. This received power data 260A is then encoded into the header part of the FSO modulated beam 105B, then transmitted to terminal 100A. At terminal 100A, the received power data 260A is decoded by the modem 235 and transmitted to the controller 250. In this example case, since the header 400 includes received power data 260A, the header 400 of return beam 105B is transmitted to the controller 250. The received power data 260B in the header 400 includes the $P_{QC}$ and RSSI signals. The controller 250 selects either the $P_{QC}$ or the RSSI signal via the selector 405. In some embodiments, the controller 250 selects both signals (e.g., the signals are summed).

As illustrated in the controller and described by Eq. 6, the alignment errors $X_{10}$ and $Y_{10}$ can be obtained by performing various calculations on the selected received power data, such as taking the natural logarithm of the received power data, multiplying it by a reference oscillation ($\cos(\omega_1 t)$ or $\sin(\omega_1 t)$), and multiplying it by various constants such as $\frac{1}{2}A_d$ and $Rg_1$ (e.g., determined from the Tx Beam geometry). Additional processing steps may be performed to determine the alignment errors. For example, a band-pass filter and a low-pass filter (e.g., to determine an average) may be applied to the calculated signals. The calculated alignment errors $X_{10}$ and $Y_{10}$ are transmitted to the BSU 205A.

Although this detailed description contains many specifics, these should not be construed as limiting the scope of the invention but merely as illustrating different examples. It should be appreciated that the scope of the disclosure includes other embodiments not discussed in detail above. The dither pattern may be something other than circular, for example, a path selected for ease of mechanical implementation or that covers the specific types of motion and scintillation that may occur between the Tx and Rx. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Note that the components and terminals illustrated and described can include any electronics and/or computer instructions that may be embodied in digital or analog circuits. This may be implemented using any one or more of Application Specific Integrated Circuits (ASICs), field-programmable gate arrays (FPGAs), and general-purpose computing circuits, along with corresponding memories and computer program instructions for carrying out the described operations. The specifics of these components are not shown for clarity and compactness of description.

Depending on the form of the components, the "coupling" between components may take different forms. For example, dedicated circuitry can be coupled to each other by hard-wiring or by accessing a common register or memory location, for example. Software "coupling" can occur by any number of ways to pass information between software components (or between software and hardware, if that is the case). The term "coupling" is meant to include these examples and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

What is claimed is:

1. A terminal for use in a free space optical (FSO) communications system, the terminal comprising:
   a beam steering unit (BSU) configured to steer an FSO beam in a direction towards a remote terminal;
   a motion generator coupled to the BSU configured to dither the direction of the FSO beam, wherein a dither amplitude is based on an amount of FSO interference; and
   a controller configured to receive power data representative of a power of the FSO beam received at the remote terminal and configured to control a direction of the FSO beam based on the power data.

2. The FSO communications system of claim 1, wherein the received power data is encoded in a second FSO beam transmitted by the remote terminal and received by the FSO terminal.

3. The FSO communications system of claim 1, wherein the terminal further comprises:
   a detector configured to detect a received power of a second FSO beam received by the terminal, wherein the motion generator is additionally coupled to the detector and is further configured to dither a position of the detector relative to an optical axis of the second FSO beam.

4. The FSO communications system of claim 1, wherein the remote terminal comprises:
   a detector configured to detect the power of the FSO beam, and
   a second BSU configured to steer a second FSO beam in a direction towards the terminal, wherein the power data representative of the power of the FSO beam is encoded in the second FSO beam.

5. The FSO communications system of claim 4, wherein the remote terminal further comprises a motion generator coupled to the second BSU and configured to dither the direction of the second FSO beam.

6. The FSO communications system of claim 1, wherein the terminal and the remote terminal form a closed feedback loop of the FSO communications system.

7. The FSO communications system of claim 6, wherein a dither frequency of the FSO beam is at least 5 times larger than a bandwidth of the closed feedback loop.

8. The FSO communications system of claim 1, wherein the FSO beam includes a first portion and a second portion, wherein the motion generator is configured to dither a direction of the first portion of the FSO beam but is not configured to dither a direction of the second portion of the FSO beam.

9. The FSO communications system of claim 8, wherein the power data is representative of (1) a power of the first portion of the FSO beam received at the remote terminal and (2) a power of the second portion of the FSO beam received at the remote terminal.

10. The FSO communications system of claim 8, wherein the second portion of the FSO beam is larger than the first portion.

11. The FSO communications system of claim 8, wherein the terminal further comprises: a partially reflective mirror that separates the first portion and the second portion.

12. The FSO communications system of claim 1, wherein the controller is further configured to receive data representative of a status of the remote terminal and a status of a second BSU of the remote terminal.

13. A method comprising:
transmitting, by a local first free space optical (FSO) terminal, a first FSO beam along a transmit direction to a remote FSO terminal, wherein transmitting the first FSO beam comprises dithering the transmit direction of the first FSO beam, wherein a dither amplitude is based on an amount of FSO interference;
receiving, by the local FSO terminal, a second FSO beam from the remote FSO terminal, the second FSO beam including encoded power data indicative of power of the first FSO beam received at the remote FSO terminal; and
modifying, by the local FSO terminal, the transmit direction based on the encoded power data.

14. The method of claim 13, further comprising dithering a position of a detector of the local FSO terminal relative to an optical axis of the second FSO beam, the detector configured to detect a received power of the second FSO beam.

15. The method of claim 13, further comprising:
detecting the power of the first FSO beam received at the remote FSO terminal;
encoding, by the remote FSO terminal, the power data indicative of the power of the first FSO beam received at the remote FSO terminal in the second FSO beam;
and transmitting, by the remote FSO terminal, the second FSO beam along a transmit direction to the local FSO terminal.

16. The method of claim 15, wherein transmitting the second FSO beam comprises dithering the transmit direction of the second FSO beam.

17. The method of claim 13, wherein the local FSO terminal and the remote FSO terminal form a closed feedback loop.

18. The method of claim 17, wherein a dither frequency of the first FSO beam is at least 5 times larger than a bandwidth of the closed feedback loop.

19. The method of claim 13, wherein the first FSO beam includes a first portion and a second portion, and dithering the transmit direction of the first FSO beam comprises dithering a transmit direction of the first portion of the first FSO beam and not dithering a transmit direction of the second portion of the first FSO beam.

20. The method of claim 19, wherein the power data is representative of (1) a power of the first portion of the first FSO beam received at the remote FSO terminal and (2) a power of the second portion of the first FSO beam received at the remote terminal.

* * * * *